United States Patent

Wagener

[11] Patent Number: 5,885,094
[45] Date of Patent: Mar. 23, 1999

[54] CONNECTING TERMINAL FOR A BUSBAR IN A BUSBAR SYSTEM

[75] Inventor: Hans Wagener, Dietzhölztal, Germany

[73] Assignee: Rittal-Werk Rudolf Loh GmbH & Co. KG, Herborn, Germany

[21] Appl. No.: 836,991

[22] PCT Filed: Mar. 1, 1996

[86] PCT No.: PCT/EP96/00867

§ 371 Date: May 27, 1997

§ 102(e) Date: May 27, 1997

[87] PCT Pub. No.: WO96/28870

PCT Pub. Date: Sep. 19, 1996

[30] Foreign Application Priority Data

Mar. 10, 1995 [DE] Germany ............... 195 08 515.9

[51] Int. Cl.[6] ............................................. H01R 25/00
[52] U.S. Cl. ................................... 439/110; 439/811
[58] Field of Search ................... 439/110–122, 810–814

[56] References Cited

FOREIGN PATENT DOCUMENTS

| | | |
|---|---|---|
| 1910649 | 9/1970 | Germany . |
| 8809666 | 11/1988 | Germany . |
| 3921665 | 1/1991 | Germany . |
| 4235444 | 1/1994 | Germany . |

Primary Examiner—Neil Abrams
Assistant Examiner—Eugene G. Byrd
Attorney, Agent, or Firm—Speckman Pauley Petersen & Fejer

[57] ABSTRACT

A connecting terminal for a busbar in a busbar system in which the busbar has an n-agonal cross-section (n≧3) with longitudinal undercut acceptor grooves in its outer sides. A connecting terminal having simple parts and which is easy to fit has two terminal sections which can be fitted on the busbar and connected together, and can be inserted with securing components in recesses in the busbar and secured transversely therein. The terminal sections form a terminal chamber over an outside of the busbar directed transversely thereto and securing screws can be adjusted in webs of the terminal sections away from the outside of the busbar which clamp terminal sections in the terminal chamber to a line inserted therein with a connection to the outside of the busbar.

17 Claims, 3 Drawing Sheets

CONNECTING TERMINAL FOR A BUSBAR IN A BUSBAR SYSTEM

BACKGROUND OF THE INVENTION

1. Field of the Invention

This invention relates to a connecting terminal for a busbar of a busbar system, wherein the busbar has a cross section with at least three sides, wherein longitudinally oriented undercut receiving grooves are cut into exteriors of the busbar.

2. Description of Prior Art

Busbars for high currents require a large cross section which complicates the attachment of branching lines. To make this easier, multi-sided busbars have already been considered, which have longitudinally oriented undercut receiving grooves in their exteriors.

SUMMARY OF THE INVENTION

It is one object of this invention to provide a connecting terminal of the type previously mentioned, which can be easily attached to a busbar and which provides a clear connection of a conductor which is attached to the busbar.

In accordance with this invention this object is attained with a connecting terminal having two terminal elements, which can be attached from both sides to the busbar and can be connected with each other, and which can be introduced with holding elements into receivers of the busbar and can be fixed in place transversely to the busbar. The terminal elements form a terminal chamber which extends transversely over an exterior of the busbar. Fastening screws can be positioned in the bars of the terminal elements which face away from the exterior of the busbar, which wedge clamping elements introduced into the terminal chamber against a conductor introduced into the terminal chamber, while connecting it with the exterior of the busbar.

The two terminal elements are placed from both sides against the busbar and introduced by holding elements into receivers and maintained transversely to the busbar. The two terminal elements are connected with each other to form a unit, which is positively maintained on the busbar and at most can be displaced in a longitudinal direction. The conductor to be connected, for example a feed conductor of a large cross section, is wedged with the aid of the clamping elements and the fastening screws and clamped to the busbar. Depending on the use of one or two clamping elements, the conductor is connected directly or by way of a clamping element with the exterior of the busbar. When the fastening screws are tightened, the connecting terminal is also fixed in place, axially and non-displaceably, on the busbar.

In accordance with one embodiment of this invention, the introduction of the holding elements of the terminal elements into the undercut receivers of the busbar is simplified because the receiving grooves are formed as T-grooves. The terminal elements support holding elements, which have holding shoulders which grip behind the T-groove only on the side facing the occupied exterior of the busbar.

In this case and with an appropriate design the introduction can also take place transversely to the busbar, if a corresponding transverse amount of play is provided between the receiver and the holding element.

The connection of the terminal elements is easily achieved with terminal elements that can be connected with each other in the area of the connecting plane by means of T-shaped or dovetailed connecting elements, wherein the direction of connection extends parallel with the longitudinal axis of the busbar. This can occur with an appropriate oppositely directed displacement of the terminal elements on the busbar.

In accordance with one preferred embodiment of this invention, the terminal elements are embodied in a mirror-reversed manner and in the connecting area only have the connecting elements which are matched to each other.

So that the exterior of the busbar is easily accessible for the connection with a clamping element or the conductor to be connected, in one embodiment the terminal chamber facing the busbar has sides which terminate flush with the exterior of the busbar, or the busbar projects into the terminal chamber with its exterior.

If in accordance with a further embodiment the terminal chamber is bordered by lateral legs of the terminal elements, and guide grooves oriented vertically with respect to the exterior, for guide shoulders of the insertable clamping elements are cut into the insides of the legs which face each other, then the clamping elements are guided and maintained in the terminal elements.

The introduction of the clamping elements into the terminal chamber is simplified because the bars of the terminal elements are embodied as separate elements, which can be connected with the terminal elements.

If the embodiment is such that the bars of both terminal elements are combined into a single bar element, which also connects the terminal elements with each other, this bar element is also used to connect the terminal elements, which can then be identically laid out.

The dimensions of the clamping elements can be such that the clamping elements inserted into the terminal chamber are matched to the width of the terminal chamber, wherein in depth they extend over only one terminal element or over both terminal elements.

The terminal elements can also be made of an electrically conducting material and can add directly to the electrical connection between the busbar and the conductor to be connected.

The connecting surface between the two elements can be increased because the exterior of the busbar facing the terminal chamber is closed.

Clamping of different branching conductors to the connecting terminal is simplified and improved because the clamping elements have cutouts which are matched to the cross section of the branching conductor.

BRIEF DESCRIPTION OF THE DRAWINGS

This invention will be explained in detail by means of exemplary embodiments represented in the drawings wherein.

DESCRIPTION OF PREFERRED EMBODIMENTS

Figure 2:
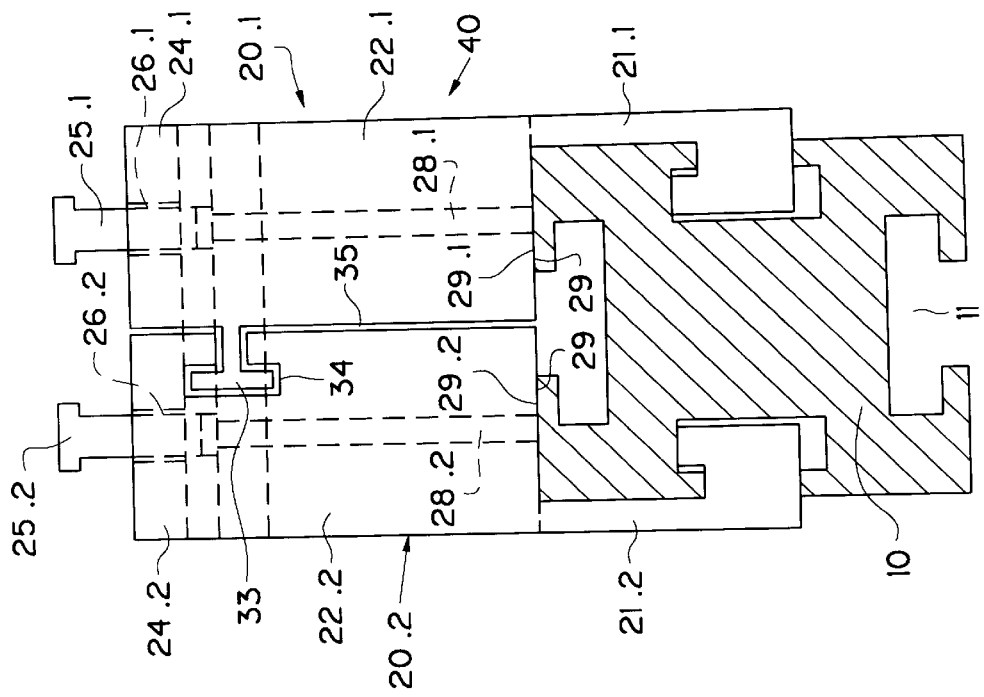
FIG. 2 is a side view of the applied connecting terminal in accordance with FIG. 1, in a direction of II as shown in FIG. 1, FIGS. 3A–3F show cross sections of exemplary embodiments of clamping elements which can be inserted into the connecting terminal.
Figure 1:
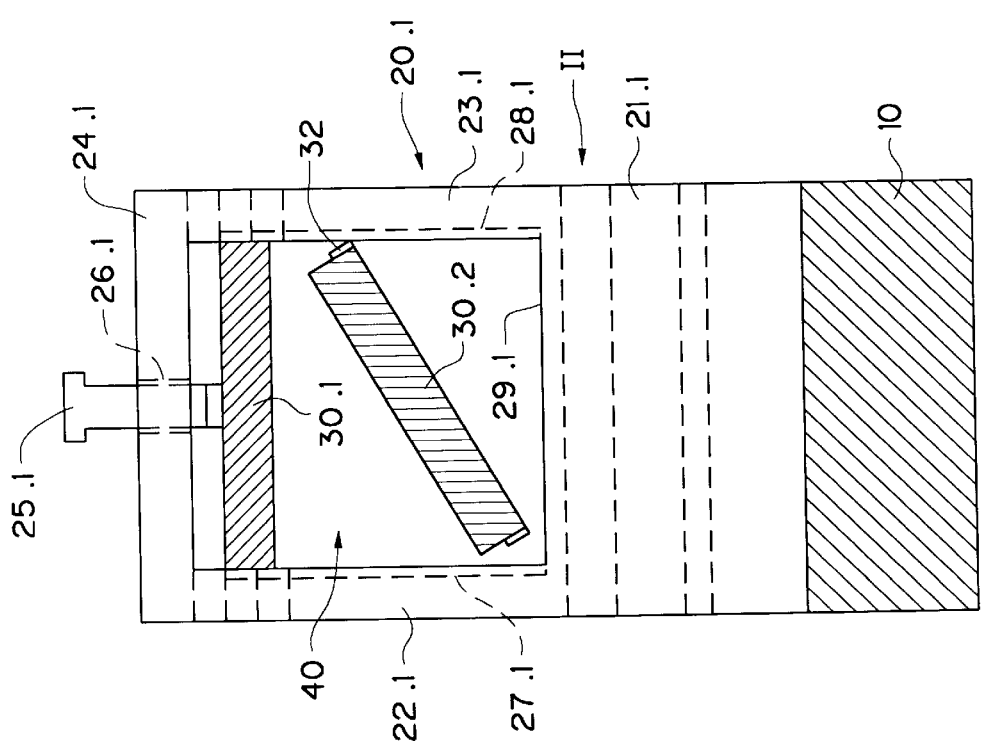
FIG. 1 is an axial view of an applied connecting terminal, viewed in an axial direction of the busbar.
Figure 3A:
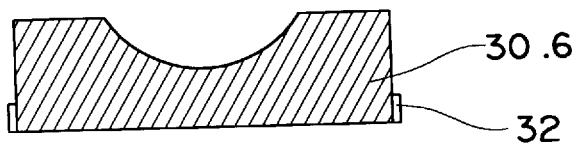
Figure 3B:
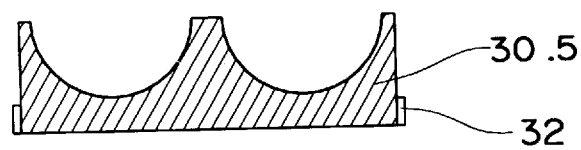
Figure 3C:
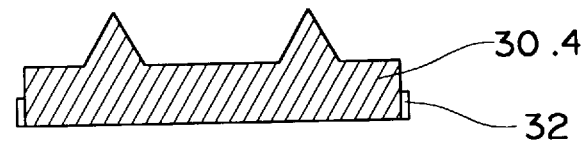
Figure 3D:
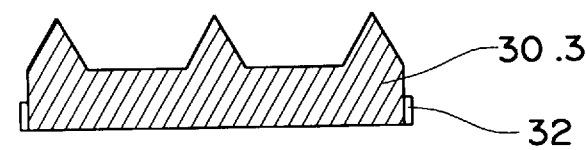
Figure 3E:
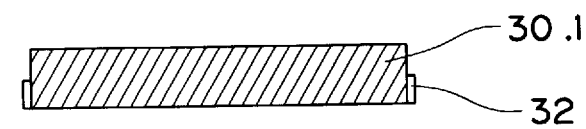
Figure 3F:
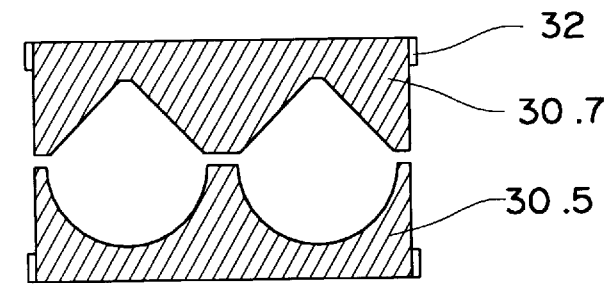

The exemplary embodiment shown in FIGS. 1 and 2 is an essentially square or rectangular busbar 10, into the exterior 29 of which longitudinally extending, T-shaped receiving grooves 11 are cut. The connecting terminal is assembled with two terminal elements 20.1 and 20.2. The terminal elements 20.1 and 20.2 end in hook-shaped holding elements 21.1 and 21.2, which are introduced into a respective receiving groove 11. The hook elements 21.1 and 21.2 are axially inserted into the receiving grooves 11, wherein in a connecting area 35 above the busbar 10 a T-bar in a T-groove formed as the connecting elements 34 and 35, respectively, connects the two terminal elements 20.1 and 20.2 at the same time.

If the hook elements 20.1 and 20.2 have a transverse play in the receiving grooves 11, then the terminal elements 20.1 and 20.2 can also be laterally inserted, and following the connection of the terminal elements 20.1 and 20.2, the connecting terminal is held on the busbar 10 so that the connecting terminal cannot be lost.

Figure 6:
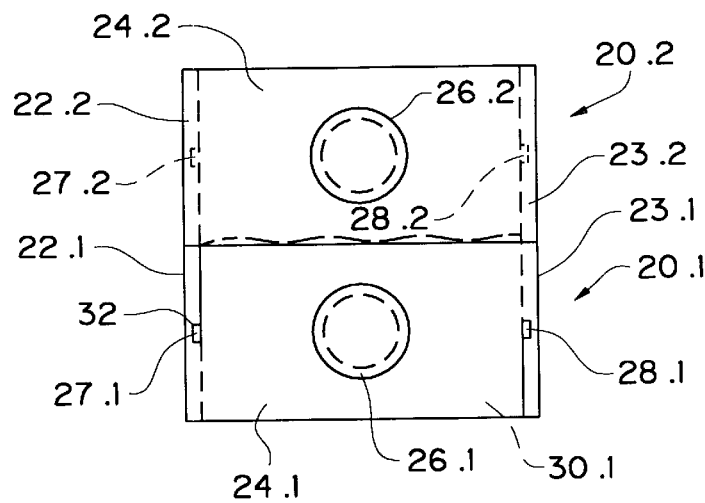
FIG. 6 is a schematic top view of the connecting terminal.

As shown in FIG. 2 in particular, the terminal elements 20.1 and 20.2 form a closed terminal chamber 40 over the exterior 29 provided for the connection, which extends transversely with respect to the busbar 10 and is bordered by the legs 22.1 and 23.1 and the bar 24.1, or the legs 22.2 and 23.2 and the bar 24.2. The cutout in the terminal elements 20.1 and 20.2 is positioned so that the lower side 29.1 or 29.2 ends flush with the facing exterior 29 of the busbar 10 when the connecting terminal is tightened. The exterior 29 of the busbar 10 can also project into the terminal chamber 40. Respectively, one threaded bore 26.1 or 26.2 for a fastening screw 25.1 or 25.2 is formed within the bars 24.1 and 24.2 of the terminal elements 20.1 and 20.2. Vertical guide grooves 27.1 and 28.1 or 27.2 and 28.2 are cut into the facing insides of the legs 22.1 and 23.1 or 22.2 and 23.2, respectively, into which the shoulders 32 of clamping elements 30.1 or 30.2 can be inserted, so that the clamping elements are held in the terminal chamber 40 so that they are displaceable in a direction toward the exterior 29 of the busbar 10. In this case the clamping elements 30.1 or 30.2 can extend over the depth of the associated terminal element 20.1 or 20.2. However, clamping elements can also be employed which extend over the entire depth of the terminal chamber 40 and are guided in both terminal elements 20.1 and 20.2, as shown in FIG. 6.

As shown in FIG. 3, the clamping elements 30.1 to 30.7 of the most diverse type can be inserted into the terminal chamber 40. In this case the clamping elements 30.1 to 30.7 can be embodied merely as a clamping plate, or can have recesses for one or several conductors on one side. In this case the cross sections of the recesses are matched to the cross sections of the conductors. In this case the shoulders 32 are laterally formed so that the clamping elements 30.1 to 30.7 take up their correct position in the terminal chamber 40 following the insertion into the guide grooves 27.1, 28.1 or 27.2, 28.2.

Figures 4, 5:
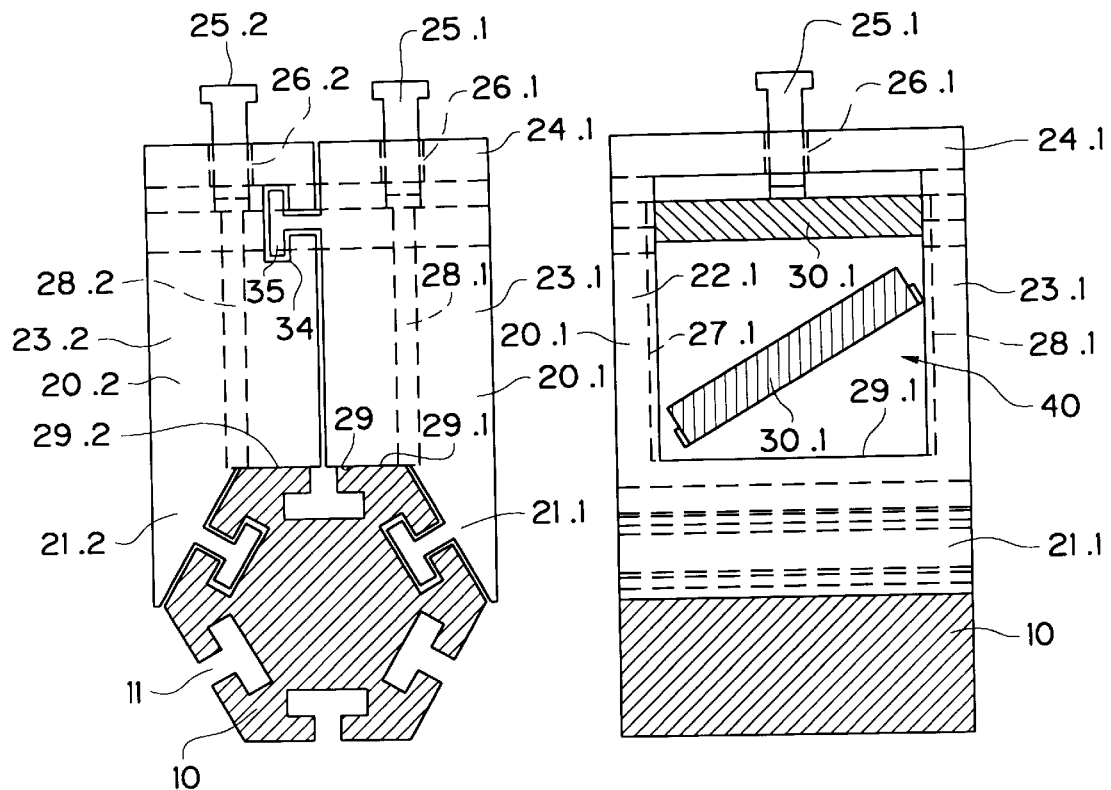
FIG. 4 is a side view similar to the applied connecting terminal shown in FIG. 2, but showing a connecting terminal for a hexagonal busbar.
FIG. 5 is an axial view similar to the applied connecting terminal shown in FIG. 1 of the connecting terminal and as shown in FIG. 4.

A hexagonal busbar 10 is shown in the exemplary embodiment of FIGS. 4 and 5. The application of the terminal elements 20.1 and 20.2 is the same as in the exemplary embodiment shown in FIGS. 1 and 2, only the holding elements 21.1 and 21.2 are adapted to the new cross section of the busbar 10. To increase the connecting surface, the exterior 29 of the busbar 10 can also have a receiving groove 11. If, as shown in FIG. 5, the bar is not connected in one piece with the terminal elements 20.1 or 20.2, the clamping elements 30.1 to 30.7 can be easily inserted into the terminal chamber 40 when the bar 24.3 is removed. In this case the bar 24.3 can also extend over both terminal elements 20.1 and 20.2, can receive both fastening screws 25.1 and 25.2 and simultaneously can connect the two terminal elements 20.1 and 20.2. The connecting elements 33 and 34 can then be omitted and the terminal elements 20.1 and 20.2 can be identically embodied.

With this connecting terminal the terminal elements 20.1 and 20.2 can also be constructed of an electrically conducting material and can aid in the electrical connection between the busbar 10 and the conductor or conductors to be connected or branching off.

I claim:

1. In a connecting terminal for a busbar of a busbar system, wherein the busbar has at least a three-sided cross section, and wherein longitudinally oriented undercut receiving grooves are formed in a plurality of exterior surfaces of the busbar, the improvement comprising:

two terminal elements (20.1, 20.2) attachable from both sides to the busbar (10), the terminal elements (20.1, 20.2) connectable with each other, a plurality of holding elements (21.1, 21.2) of the terminal elements (20.1, 20.2) mateably fixable within the receiving grooves (11) of the busbar (10), the receiving grooves (11) being T-shaped, the holding elements (21.1.21.2) having holding shoulders gripping behind the receiving grooves (11) only on a side facing the exterior (29) of the busbar (10), the terminal elements (20.1, 20.2) forming a terminal chamber (40) which extends transversely over an exterior (29) of the bus bar (10), a plurality of fastening screws (25.1, 25.2) displaceable within a plurality of bars (24.1, 24.2) of the terminal elements (20.1, 20.2) which face away from the exterior (29) of the bus bar (10), the fastening screws (25.1, 25.2) wedging a plurality of clamping elements (30.1 to 30.7) introduced into the terminal chamber (40) against a conductor within the terminal chamber (40) while connecting the conductor with the exterior (29) of the busbar (10), the terminal chamber (40) facing the busbar (10) having a plurality of sides (29.1, 29.2) which terminate flush with the exterior (29) of the busbar (IO), the terminal chamber (40) bordered by a plurality of lateral legs (22.1. 23.1. or 22.2, 23.2) of the terminal elements (20.1, 20.2), and guide grooves (27.1. 28.1 or 27.2. 28.2), oriented vertically with respect to the exterior (29) of the busbar (10) for accommodating a plurality of guide shoulders (32) of the insertable clamping elements (30.1 to 30.7), of the lateral legs (22.1, 23. 1, or 22.2. 23.2) face each other.

2. In the connecting terminal in accordance with claim 1, wherein the terminal elements (20.1, 20.2) are connected with each other in an area of a connecting plane (35) by a T-shaped connecting element (33) and a dovetailed connecting element (34), wherein a direction of connection extends parallel with a longitudinal axis of the busbar (10).

3. In the connecting terminal in accordance with claim 2, wherein the terminal elements (20.1, 20.2) are mirror images of each other and in the area of the connecting plane (35)

only have the T-shaped and the dovetailed connecting elements (33, 34) mated with each other.

4. In the connecting terminal in accordance with claim 1, wherein the bars (24.1, 24.2) of the terminal elements (20.1, 20.2) are embodied as separate elements which are connectable with the terminal elements (20.1, 20.2).

5. In the connecting terminal in accordance with claim 4, wherein the bars (24.1, 24.2) of both terminal elements (20.1, 20.2) are integrated into a single bar element (24.3) which connects the terminal elements (20.1, 20.2) with each other.

6. In the connecting terminal in accordance with claim 5, wherein the clamping elements (30.1 to 30.7) within the terminal chamber (40) correspond to a width of the terminal chamber (40), and a depth of the terminal chamber (40) extends over at least one of the terminal elements (20.1 or 20.2).

7. In the connecting terminal in accordance with claim 6, wherein the terminal elements (20.1, 20. 2) are of an electrically conducting material.

8. In the connecting terminal in accordance with claim 7, wherein the exterior (29) of the busbar (10) facing the terminal chamber (40) is closed.

9. In the connecting terminal in accordance with claim 8, wherein the clamping elements (30.2 to 30.7) have a plurality of cutouts which is each matched to a cross section of a branching conductor.

10. In the connecting terminal in accordance with claim 1, wherein the terminal elements (20.1, 20.2) are connected with each other in an area of a connecting plane (35) by a T-shaped connecting element (33) and a dovetailed connecting element (34), wherein a direction of connection extends parallel with a longitudinal axis of the busbar (10).

11. In the connecting terminal in accordance with claim 1, wherein the terminal elements (20.1, 20.2) are mirror images of each other and in an area of a connecting plane (35) only have the T-shaped and the dovetailed connecting elements (33, 34) mated with each other.

12. In the connecting terminal in accordance with claim 1, wherein the terminal chamber (40) facing the busbar (10) has a plurality of sides (29.1, 29.2) which terminate flush with the exterior (29) of the busbar (10).

13. In the connecting terminal in accordance with claim 1, wherein the terminal chamber (40) is bordered by a plurality of lateral legs (22.1, 23.1, or 22.2, 23.2) of the terminal elements (20.1, 20.2), and guide grooves (27.1, 28.1 or 27.2, 28.2), oriented vertically with respect to the exterior for accommodating a plurality of guide shoulders (32) of the insertable clamping elements (30.1 to 30.7), of the legs (22.1, 23.1, or 22.2, 23.2) face each other.

14. In the connecting terminal in accordance with claim 1, wherein the clamping elements (30.1 to 30.7) within the terminal chamber (40) correspond to a width of the terminal chamber (40), and a depth of the terminal chamber (40) extends over at least one of the terminal elements (20.1 or 20.2).

15. In the connecting termninal in accordance with claim 1, wherein the terminal elements (20.1, 20. 2) are of an electrically conducting material.

16. In the connecting terminal in accordance with claim 1, wherein the exterior (29) of the busbar (10) facing the terminal chamber (40) is closed.

17. In the connecting terminal in accordance with claim 1, wherein the clamping elements (30.2 to 30.7) have a plurality of cutouts which is each matched to a cross section of a branching conductor.

* * * * *